Sept. 19, 1950    C. E. NELSON    2,522,887
VEHICLE OPERATOR'S LEG SUPPORT
Filed May 20, 1947
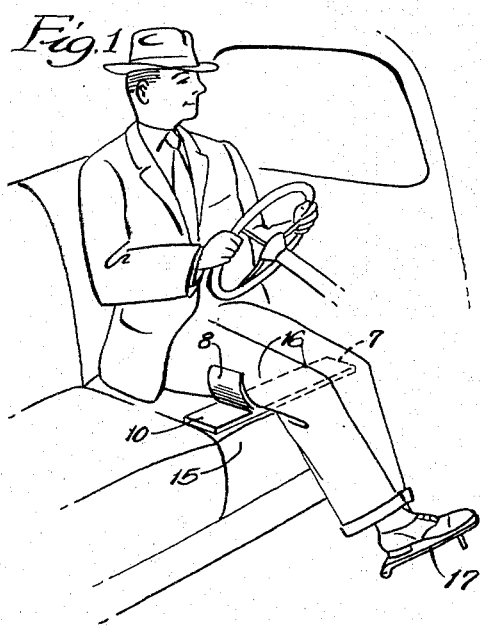
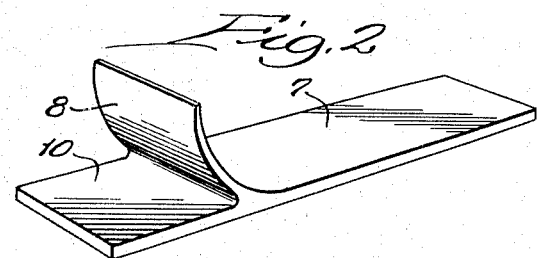
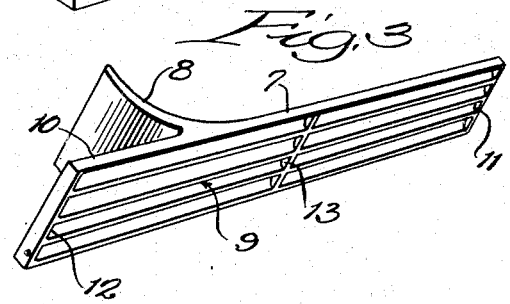
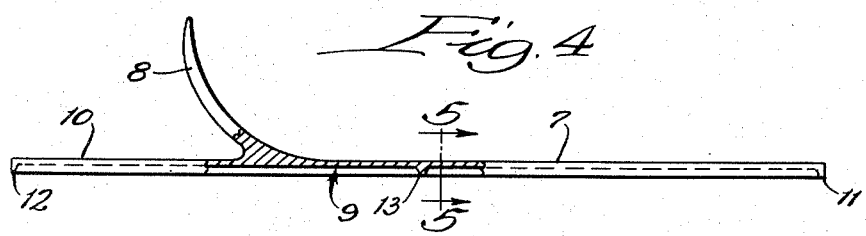
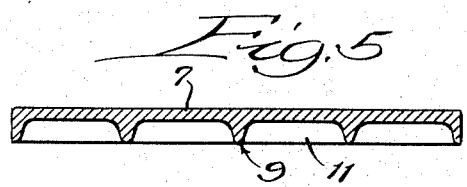
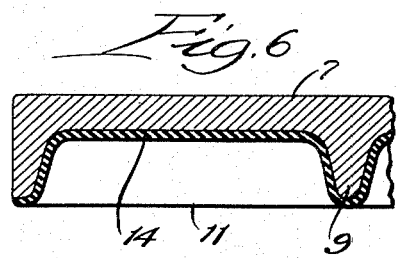
Inventor:
Clarence E. Nelson,
By Soans, Pond & Anderson
Attorneys.

Patented Sept. 19, 1950

2,522,887

UNITED STATES PATENT OFFICE 2,522,887

VEHICLE OPERATOR'S LEG SUPPORT

Clarence E. Nelson, Chicago, Ill.

Application May 20, 1947, Serial No. 749,172

4 Claims. (Cl. 155—165)

In cross-country travel, leg fatigue, particularly in the leg which has to maintain a constant contact with the throttle or accelerator, is one of the discomforts encountered by drivers of motor vehicles.

The main objects of this invention, therefore, are to provide a device of simple and practical construction suitable for convenient use by the drivers of motor vehicles on cross-country driving for relieving leg fatigue; to provide a device of this kind which as occasion may require may be inserted or removed from intermediate the driver's thighs and the seat; to provide such a device having means for buttressing the thigh against movement or outward spreading on the seat; to provide an improved formation of the under side of such a device so that it will tend to retain itself against shifting on the seat once it has been positioned for the maximum comfort of the driver; and to provide a device of this kind of a strength sufficient to be unflexed by the weight of the driver's thighs yet so restricted in dimension and weight that it requires a very minimum of space either in use or in storage and can be placed very quickly in position or removed therefrom while the vehicle is in motion.

In the accompanying drawings:

Fig. 1 is a front perspective view showing, in position under the driver's thighs, a driving aid embodying this invention;

Fig. 2 is an enlarged perspective view of the aid per se;

Fig. 3 is a similar view showing the under side of the device;

Fig. 4 is a further enlarged side elevation, a part of the structure being broken away to more clearly indicate the formation of the under side;

Fig. 5 is a further enlarged transverse sectional view taken on the line 5—5 of Fig. 4; and Fig. 6 is a further enlarged cross-sectional view showing the friction coating which is applied to the ridged under side of the device.

A driving aid constructed in accordance with this invention comprises a base part or plate 7 on which is formed an upstanding flange 8 and the underside of which is provided with ridges 9. Such a device may be made of wood, aluminum, or plastic. It would be of a width and thickness sufficient to provide required span of surface and with the desired strength but at the same time ensure a very minimum of weight and a maximum of compactness.

The plate 7 is about 14 to 20 inches long so that it may be disposed under both thighs of a driver. Preferably it would be 2 to 5 inches wide and of a thickness which will resist any bending or material flexing thereof when the weight of both thighs of the driver are resting thereon.

The flange 8 is located a short distance inwardly from one end of the plate 7, thus providing an extension 10 which serves to prevent a tilting of the plate 7 on the seat due to the pressure of the thigh on the flange 8. As shown, the flange is preferably of arcuate form and is provided so as to facilitate proper location of the plate under the thighs and also to buttress the thigh against outward movement or spreading on the seat.

The ridges 9 on the under side extend transversely and longitudinally. Transverse ridges 11 and 12 are formed at the ends of the plate 7 whereas a transverse ridge 13 is formed intermediate said ends. Between these transverse ridges extend the longitudinal ridges. A film of friction material 14 is applied to the under surface of the plate 7, as most clearly shown in Fig. 6, whereby the coated ridges 9, 11, 12, and 13 contacting the upholstered seat 15 will tend to hold the device against shifting on the seat.

As is most clearly shown in Fig. 1, a driving aid of this kind is adapted to be inserted under the thighs of the driver and rest on the upper face of the seat cushions 15, near the front margin thereof. This plate so alters the support for the thigh 16, the foot for which has to be constantly on the throttle or accelerator, that it tends to overcome or prevent the fatigue occurring from having to keep that part of the body in so fixed a position for extended periods.

The weight of the driver's thighs holds the device firmly against the seat cushion. The friction-coated ridges 9, 11, 12, and 13, on the under side, tend to retain the device in the position in which it is placed.

The fact that the plate is long enough to extend under both of the thighs, and the fact that the flange 8 is so located as to provide the extension 10, precludes the plate from tipping even though considerable pressure of the thigh 16 might be applied against the flange 8. Moreover, the flange 8 buttresses the thigh and keeps it from shifting or having too great a tendency to spread on the seat.

Variations and modifications in the details of structure and arrangement of the parts may be restorted to within the spirit and coverage of the appended claims.

I claim:

1. A device for reducing leg fatigue when the seated driver of a vehicle is required to keep a leg in substantially fixed location comprising, a plate adapted to be interposed between a driver's thighs and the front margin of the upper face of the driver's upholstered seat and adapted to be maintained in such position by gravity pressure of the thigh against the seat, and an upstanding flange on the upper face of said plate adapted to fit against the side of the thigh so as to buttress it against outward spreading movement.

2. A device for reducing leg fatigue when the seated driver of a vehicle is required to keep a leg in substantially fixed location comprising, a plate of a length approximately equal to the thickness of a pair of thighs and adapted to be interposed between a driver's thighs and the front margin of the upper face of the driver's upholstered seat and adapted to be maintained in such position by gravity pressure of both thighs against the seat, and an upstanding flange on the upper face of said plate located inwardly from one end thereof and adapted to fit against the side of one of the thighs so as to buttress it against outward spreading movement.

3. A device for reducing leg fatigue when the seated driver of a vehicle is required to keep a leg in substantially fixed location comprising, a plate of a length approximately equal to the thickness of a pair of thighs and adapted to be interposed between a driver's thighs and the front margin of the upper face of the driver's upholstered seat and adapted to be maintained in such position by gravity pressure of both thighs against the seat, an upstanding flange on the upper face of said plate located inwardly from one end thereof and adapted to fit against the side of one of the thighs so as to buttress it against outward spreading movement, and friction-coated projections on the under side of said plate adapted to contact said seat face so as to retain said plate against shifting.

4. A device for reducing leg fatigue when the seated driver of a vehicle is required to keep a leg in substantially fixed location comprising, a plate of a length approximately equal to the thickness of a pair of thighs and adapted to be interposed between a driver's thighs and the front margin of the upper face of the driver's upholstered seat and adapted to be maintained in such position by gravity pressure of both thighs against the seat, an upstanding flange on the upper face of said plate located inwardly from one end thereof and adapted to fit against the side of one of the thighs so as to buttress it against outward spreading movement, friction-coated transverse ridges formed at each end of said plate on the under side thereof, and friction-coated longitudinally disposed ridges formed on the under side of said plate and extending between said transverse end ridges.

CLARENCE E. NELSON.

REFERENCES CITED

The following references are of record in the file of this patent:

UNITED STATES PATENTS

| Number | Name | Date |
|---|---|---|
| 1,682,071 | Finn | Aug. 28, 1928 |
| 1,753,367 | Dickens | Apr. 8, 1930 |
| 1,886,595 | Sandquist | Nov. 8, 1932 |
| 2,100,737 | Foster | Nov. 30, 1937 |
| 2,225,818 | Brooks | Dec. 24, 1940 |
| 2,389,641 | Sarbach | Nov. 27, 1945 |